United States Patent
Xu et al.

(10) Patent No.: US 9,979,306 B1
(45) Date of Patent: May 22, 2018

(54) PHASE FEED-FORWARD CONTROL FOR OUTPUT VOLTAGE AC LINE RIPPLE SUPPRESSION IN DIGITAL POWER SUPPLY

(71) Applicant: Flex Ltd., Singapore (SG)

(72) Inventors: HuaMin Xu, ShenZhen (CN); Chen Wei An, ShenZhen (CN); Liu Xiao Dong, ShenZhen (CN)

(73) Assignee: Flex Ltd., Singapore (SG)

( * ) Notice: Subject to any disclaimer, the term of this patent is extended or adjusted under 35 U.S.C. 154(b) by 0 days. days.

(21) Appl. No.: 15/598,026

(22) Filed: May 17, 2017

Related U.S. Application Data (60) Provisional application No. 62/337,793, filed on May 17, 2016.

(51) Int. Cl.
| | |
|---|---|
| H02M 1/14 | (2006.01) |
| H02M 3/335 | (2006.01) |
| H02M 1/42 | (2007.01) |
| H02M 1/44 | (2007.01) |
| H02M 1/08 | (2006.01) |
| H02M 1/00 | (2006.01) |

(52) U.S. Cl.
CPC ......... *H02M 3/33523* (2013.01); *H02M 1/08* (2013.01); *H02M 1/143* (2013.01); *H02M 1/42* (2013.01); *H02M 1/44* (2013.01); *H02M 2001/0009* (2013.01); *H02M 2001/0016* (2013.01)

(58) Field of Classification Search
CPC ................. H02M 1/15; H02M 1/4225; H02M 2001/0016; H02M 2001/007; H02M 7/2176; H02M 1/14
See application file for complete search history.

(56) References Cited

U.S. PATENT DOCUMENTS

| | | | |
|---|---|---|---|
| 2011/0074302 A1* | 3/2011 | Draper ............... | H05B 41/3924 315/224 |
| 2016/0079868 A1* | 3/2016 | Yeh ................... | H02M 3/33538 363/21.09 |

* cited by examiner

*Primary Examiner* — Harry Behm
(74) *Attorney, Agent, or Firm* — Haverstock & Owens LLP (57) ABSTRACT

A power supply has a first stage for performing AC-DC voltage conversion and power factor correction and a second stage for isolated DC-DC voltage conversion. The power supply includes a feed forward mechanism for transmitting phase information corresponding to AC ripple. The phase information is transmitted from the first stage to a secondary side of the second stage as a digital signal using a low speed optical coupler, where the phase information is utilized by a DC-DC digital controller to implement AC ripple suppression using both phase compensation and amplitude compensation.

12 Claims, 4 Drawing Sheets

PHASE FEED-FORWARD CONTROL FOR OUTPUT VOLTAGE AC LINE RIPPLE SUPPRESSION IN DIGITAL POWER SUPPLY

RELATED APPLICATIONS

This Patent Application claims priority under 35 U.S.C. 119 (e) of the U.S. Provisional application Ser. No. 62/337,793, filed May 17, 2016, and entitled "Phase Feedforward Control for Output Voltage AC Line Ripple Suppression in Digital Power Supply". This application incorporates U.S. Provisional application Ser. No. 62/337,793 in its entirety by reference.

FIELD OF THE INVENTION

The present invention relates to power converters and power supplies. More particularly, the present invention relates to phase feed-forward control for output voltage AC line ripple suppression in a digital power supply.

BACKGROUND OF THE INVENTION

The power factor of an AC electric power system is defined as the ratio of the real power to the apparent power, and is a number between 0 and 1. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. Low-power-factor loads increase losses in a power distribution system and result in increased energy costs. Power factor correction (PFC) is a technique of counteracting the undesirable effects of electric loads that create a power factor that is less than 1. Power factor correction attempts to adjust the power factor to unity (1.00).

Many AC-to-DC converter applications require the converter to draw current from the AC line with a high power factor and low harmonic distortion. Most conventional methods to produce a power factor corrected power supply with isolated low voltage DC outputs include cascading converter stages. The term "cascading converter stages" refers to the use of multiple power conversion stages such that the output of one converter stage is connected to the input of the subsequent stage. Each converter stage uses controlled semiconductors such as MOSFETs or IGBTs to control the voltage, current, and/or power at the output and/or input of the converter stage. So, for example, a full-wave passive rectifier bridge is not considered to be a converter stage. While cascaded converter stages may share control circuitry, house-keeping power supplies, or communication with each other, the power semiconductors and energy storage elements that form each converter stage perform a power conversion function that is primarily independent of any other converter stage. Typical examples of converter stages are isolated or non-isolated variants of a buck converter, a boost converter, a buck-boost converter, and a sepic converter.

AC-to-DC power conversion is typically accomplished with cascaded converters instead of with a single-stage converter. For example, many AC-to-DC converters use two primarily independent converter stages: a first converter stage steps up the input rectified sinusoidal voltage to a high-voltage bus, and a second converter stage steps down the high-voltage bus to a low-voltage bus as well as provides isolation. The term "isolation" refers to isolating the input voltage from the output voltage. In particular, isolating means there is no path for DC current between the power supply's input source and its output terminals or load. Isolation is achieved using a power transformer in series with the power flow from input to output. Isolation can be applied to the power converter as a whole, or to individual components within the power converter where the voltage input to the component is isolated from the voltage output from the component.

When the phase of the voltage and current are not aligned due to certain load characteristics, there is a reduction in actual power, which wastes energy. If the phases are perfectly matched, then the power factor is unity. A PFC circuit functions to maximize alignment of the voltage and current. A problem with the PFC circuit is the resulting ripple. The most common meaning of ripple is the small unwanted residual periodic variation of the direct current (DC) output of a power supply which has been derived from an alternating current (AC) source. This ripple is due to incomplete suppression of the alternating waveform within the power supply. Within digital circuits, ripple reduces the threshold at which logic circuits give incorrect outputs and data is corrupted. In the PFC circuit, the input AC voltage is boosted to an output DC voltage. The PFC circuit attempts to maintain a constant DC bus voltage at the output while drawing a current that is always in phase with and at the same frequency as the input AC line voltage. Conversion of AC-to-DC results in ripple, or AC ripple since the ripple is caused be converting the AC line voltage to DC voltage. The ripple generated at the output of the PFC is propagated through a second stage DC-to-DC power converter and experienced as output DC voltage ripple. Loads coupled to the output specify maximum output voltage ripple. It is therefore desirable to design a power supply with output low frequency ripple suppression.

Figure 1:
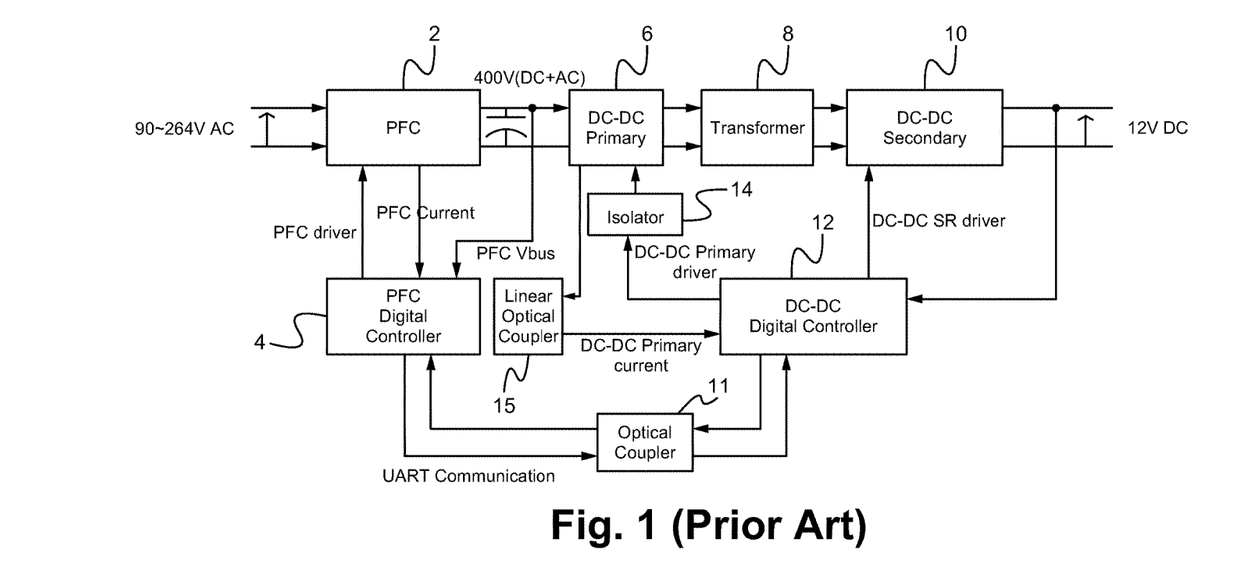
FIG. 1 illustrates a schematic block diagram of a first approach for suppressing the low frequency output voltage ripple of a power supply.

Various approaches have been used to suppress the low frequency output voltage ripple. FIG. 1 illustrates a schematic block diagram of a first approach for suppressing the low frequency output voltage ripple of a power supply. A first stage PFC boost converter converts an input AC voltage, such as 110V or 220V AC line voltage, to a boosted output DC voltage, such as 400V DC, provided as a high voltage bus. The AC ripple on the output 440V DC is at 50-60 Hz. A second stage isolated buck-type converter steps down to an isolated low voltage output, such as 12V DC. A PFC circuit block 2 and a PFC digital controller 4 function as a first stage PFC boost converter. The PFC circuit block 2 is configured to boost the input AC voltage to the boosted output DC voltage. The PFC circuit block 2 is also configured to perform power factor correction under control of the PFC digital controller 4. A DC-DC primary circuit block 6, a transformer 8, a DC-DC secondary circuit block 10, and a DC-DC digital controller 12 function as a second stage isolated buck-type converter. A special type of optical coupler, a linear optical coupler 15, transmits an analog signal from the DC-DC primary circuit block 6 to the DC-DC digital controller 12 across the isolation barrier formed by the transformer 8. The analog signal represents a primary current of the converter in the DC-DC primary circuit block 6, shown as DC-DC primary current in FIG. 1. An isolator circuit block 14 includes an optical coupler and related circuitry for transmitting digital signals from the DC-DC digital controller 12 to the DC-DC primary circuit block 6 across the isolation barrier formed by the transformer 8. The optical coupler in the isolator circuit block 14 is a high speed optical coupler. High speed optical couplers are used to transfer digital signals with high frequencies, typically greater than 10 kHz. Each of the PFC digital controller 4 and the DC-DC digital controller 12 include a UART (Universal Asynchronous Receiver/Transmitter), and an optical coupler 11 enables UART communication between the PFC digital controller 4 and the DC-DC digital controller 12 across the insolation barrier. The optical coupler 11 is either a high speed optical coupler or a low speed optical coupler depending on the baud rate. Low speed optical couplers are used to transfer digital signals with low frequencies, typically equal to or less than 10 kHz. The DC-DC secondary circuit block 10 includes a synchronous rectifier (SR), which is driven by the DC-DC digital controller 12 via a DC-DC SR driver signal.

The second stage isolated buck-type converter has a voltage regulating circuit that includes the DC-DC digital controller 12 and the isolator circuit block 14. The optical coupler circuit in cooperation with the DC-DC digital controller 12 provides a driver signal to the DC-DC primary circuit block 6, shown as DC-DC primary driver in FIG. 1. The DC-DC digital controller 12 is a regulator for the power supply to ensure the output voltage is regulated. The DC-DC digital controller 12 senses the output voltage value and compares the sensed output voltage value to a reference value to generate an error value. The DC-DC primary driver signal is output based on the error value. The DC-DC primary circuit block 6 includes a main switch coupled to the high voltage bus. The DC-DC primary driver signal is used to drive the main switch, the duty cycle of which is adjusted to compensate for any variances in an output voltage Vout. In other embodiments, the DC-DC primary driver signal is simply the error signal, and the DC-DC primary circuit block 6 includes a primary side controller coupled to the main switch. The primary side controller receives the error signal from the isolator circuit block 14 and accordingly adjusts the duty cycle of the main switch to compensate for any variances in an output voltage Vout Although not explicitly shown in FIG. 1, the circuit can also include an EMI filter, typically coupled between an AC input source and the rest of the converter, to prevent noise from coupling back to the AC source, as well as a full-wave diode rectifier bridge coupled to the EMI filter configured to provide a rectified sinusoidal input voltage to the rest of the converter. The isolated buck-type converter can include various combinations of rectifiers and windings on the secondary side of the transformer to generate an isolated DC output voltage.

Figure 2:
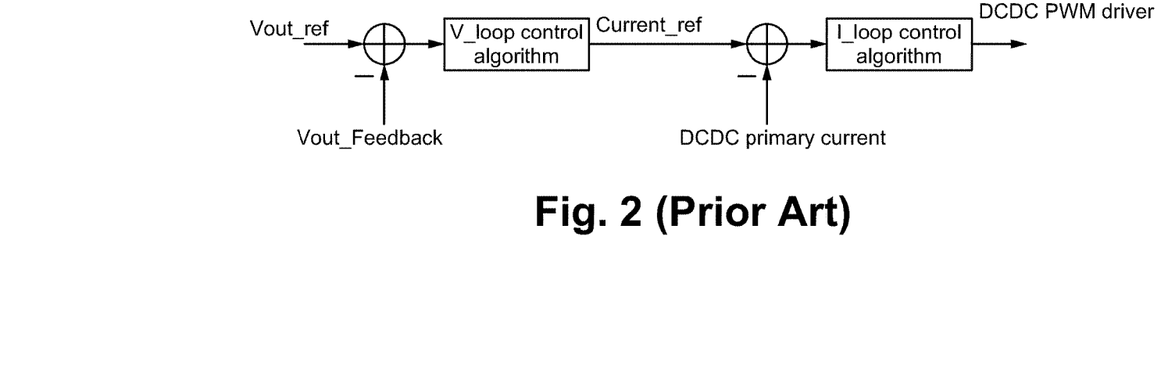
FIG. 2 illustrates an exemplary functional block diagram within the DC-DC digital controller of FIG. 1 used to implement the switch current control mode.

The output voltage ripple is suppressed by using a switch current control mode to control loop response for output voltage low frequency ripple suppression where the switch current refers to the DC-DC primary current. FIG. 2 illustrates an exemplary functional block diagram within the DC-DC digital controller 12 of FIG. 1 used to implement the switch current control mode. The switch current control mode uses the input current, DC-DC primary current, as a feedback signal to the control loop. As shown in FIG. 2, the sensed output voltage, Vout Feedback, is compared to a reference output voltage Vout ref, the difference of which is input to a voltage loop control algorithm. The voltage loop control algorithm outputs a reference current Current ref which is compared to the DC-DC primary current, the difference of which is input to a current loop control algorithm. The current loop control algorithm outputs the DC-DC primary driver signal, such as the DC-DC PWM driver signal, that is transmitted to the DC-DC primary circuit block 6 via the isolator circuit 14.

However, using the switch current control mode requires a high frequency analog AC current signal to be transferred from the primary side to the secondary side. Although a low cost transformer can be used for this function, high frequency analog signals can be easily affected by noise. As such, the performance is limited by high frequency analog signal circuit design. Further, processing the analog AC current signal requires an analog-to-digital converter (ADC) in the DC-DC digital controller. Also, the switch current has a relatively high frequency, typically 100 kHz. To recover the analog AC current signal by digital sampling, the sampling frequency needs to be at least double the switch frequency. As such, the control performance is influenced by the digital IC computing speed. The switch current control mode uses an analog AC current signal as a feed forward signal to the DC-DC digital controller on secondary side. However, this approach increases the complexity of the whole design because current needs to added to the control loop. Further, the analog AC current signal delivered from the primary side to the secondary side is not linear, and as such there are significant challenges to obtaining an accurate switch current value.

Figure 3:
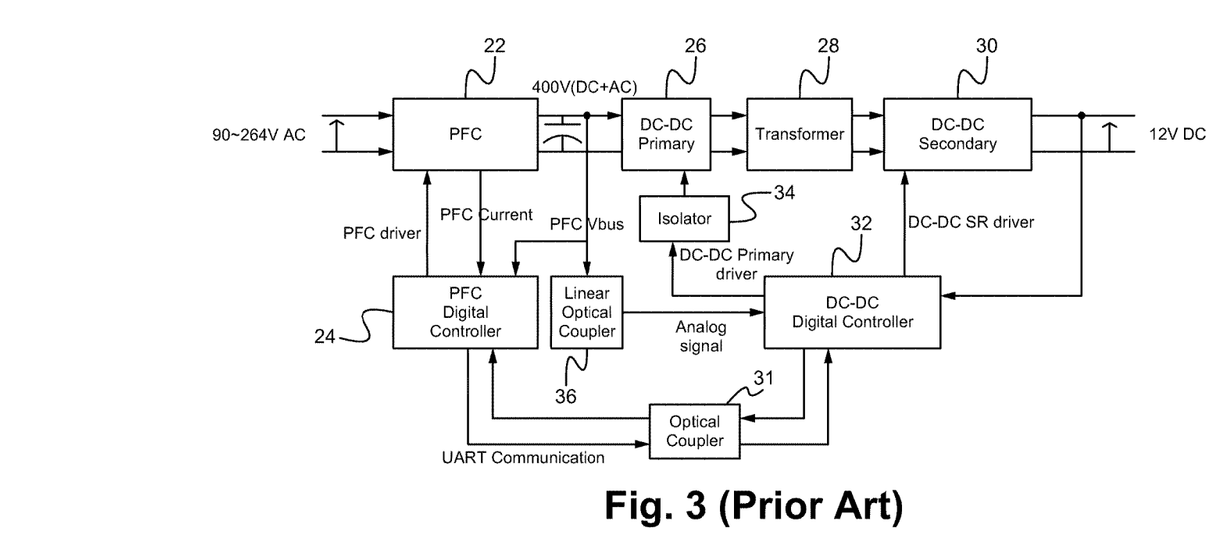
FIG. 3 illustrates a schematic block diagram of a second approach for suppressing the low frequency output voltage ripple of a power supply.

Instead of the DC-DC digital controller using a switch current control mode, an alternative approach is for the DC-DC digital controller to use input voltage feed forward control for suppressing the low frequency output voltage ripple. FIG. 3 illustrates a schematic block diagram of a second approach for suppressing the low frequency output voltage ripple of a power supply. The power supply shown in FIG. 3 is similar to the power supply of FIG. 1 in that it has a first stage PFC boost converter that converts an input AC voltage to a boosted output DC voltage, and a second stage isolated buck-type converter that steps down the boosted output DC voltage to an isolated low voltage output DC voltage. The first stage PFC boost converter includes a PFC circuit block 22 and a PFC digital controller 24. The second stage isolated buck-type converter includes a DC-DC primary circuit block 26, a transformer 28, a DC-DC secondary circuit block 30, and a DC-DC digital controller 32. An isolator circuit block 34 includes a high speed optical coupler and related circuitry for transmitting a DC-DC primary driver signal from the DC-DC digital controller 32 to the DC-DC primary circuit block 26. Each of the PFC digital controller 24 and the DC-DC digital controller 32 include a UART, and an optical coupler 31 enables UART communication between the PFC digital controller 24 and the DC-DC digital controller 32 across the insolation barrier. The optical coupler 31 is either a high speed optical coupler or a low speed optical coupler depending on the baud rate. The first stage PFC boost converter and the second stage isolated buck-type converter function similarly as in FIG. 1 to regulate the output voltage. However, instead of using switch current for low frequency output voltage ripple suppression, the circuit of FIG. 3 transfers an analog signal representative of the high voltage bus, which includes the AC ripple component, at the output of the PFC circuit block 2. A linear optical coupler 36 is used to sense the AC ripple component of the high voltage bus, generate a corresponding analog signal and optically transmit the analog signal to the DC-DC digital controller 32. The voltage at the high voltage bus is a combination of a DC component having a voltage level of about 400V DC and the AC ripple component with a peak-to-peak voltage of about 20V and a frequency of 100-120 Hz, which is double that of the AC line frequency. The AC ripple on the output from the PFC circuit block 22 is very small component, e.g. 10-20V or 2-5%, of the overall 400V signal at the high voltage bus. In order for the AC ripple to be suppressed, the size of the AC ripple needs to be quantified and conveyed to the DC-DC digital controller 32. A linear optical coupler is required to accurately convey this small relative amount of the AC ripple. In order to transmit an analog signal from the primary side to the secondary side, a linear optical coupler is necessary because the linear optical coupler provides a linear relationship between the input signal and the output signal. If instead an optical coupler of the type that transmits digital signals is used, it may not be possible to differentiate the AC ripple component from the entire transmitted signal.

Figure 4:
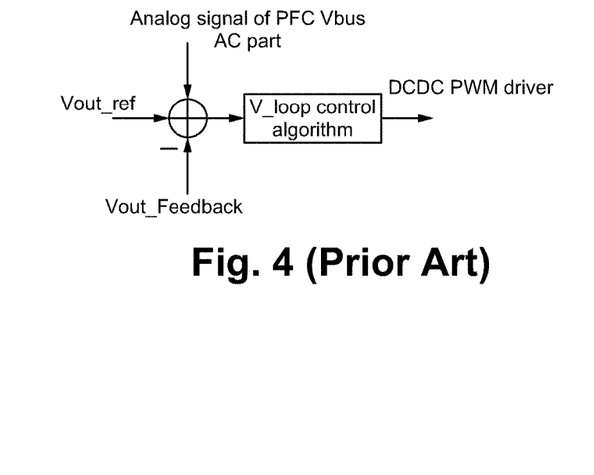
FIG. 4 illustrates an exemplary functional block diagram within the DC-DC digital controller of FIG. 3 used to implement the input voltage feed forward control.

FIG. 4 illustrates an exemplary functional block diagram within the DC-DC digital controller 32 of FIG. 3 used to implement the input voltage feed forward control. The input voltage feed forward control uses the AC portion of the PFC Vbus transmitted as the analog signal via the linear optical coupler 36 as a feedback signal to the control loop. As shown in FIG. 4, the sensed output voltage, Vout Feedback, is compared to a reference output voltage Vout ref, the difference of which added to a digital conversion of the analog signal and input to a voltage loop control algorithm. The voltage loop control algorithm outputs the DC-DC primary driver signal, such as the DC-DC PWM driver signal, that is transmitted to the DC-DC primary circuit block 26 via the isolator circuit 34.

A linear optical coupler configured to optically transmit an analog signal is considerably more expensive than an optical coupler of the type included in the isolator circuit block 34, configured to accurately transmit a digital signal. The analog signal optically transmitted by a linear optical coupler represents an amplitude compensation corresponding to the amplitude of the AC ripple. However, AC ripple includes both the amplitude component and a phase component, where the phase component is the difference between the AC voltage and AC current waveforms at the high speed bus. The phase component is not included in the optically transmitted analog signal. Additionally, the control loop for the second stage isolated buck-type converter is a digital control loop. Therefore, the analog signal optically transmitted by the linear optical coupler 36 can not be input to the DC-DC digital controller via a general purpose input/output (GPIO) interface. Instead, the DC-DC-digital controller must include an analog-to-digital converter (ADC) channel for receiving the analog signal.

SUMMARY OF THE INVENTION

Embodiments are directed to a power supply having a first stage for performing AC-DC voltage conversion and power factor correction and a second stage for isolated DC-DC voltage conversion. The power supply includes a feed forward mechanism for transmitting phase information corresponding to AC ripple. The phase information is transmitted from the first stage to a secondary side of the second stage as a digital signal using a low speed optical coupler, where the phase information is utilized by a DC-DC digital controller to implement AC ripple suppression using both phase compensation and amplitude compensation.

In an aspect, a power supply includes a first stage boost converter, a second stage isolated converter, and a low speed optical coupler. The first stage boost converter is configured to convert an input AC voltage to an output DC voltage and to perform power factor correction. The first stage boost converter comprises a PFC digital controller configured to sense a PFC output current and a PFC output voltage, to determine a phase difference between the PFC output current and the PFC output voltage, and to generate and output a digital signal signifying the determined phase difference. The second stage isolated converter is coupled to the first stage boost converter and is configured to receive as input the PFC output voltage and to output a DC output voltage. The second stage isolated converter includes a DC-DC digital controller configured to sense the DC output voltage and to regulate the DC output voltage. The low speed optical coupler is coupled to the PFC digital controller and the DC-DC digital controller to receive as input the digital signal output from the PFC digital controller and to provide as output the digital signal to the DC-DC digital controller. The DC-DC digital controller is further configured to provide AC voltage ripple suppression using a phase compensation determined according to the digital signal. In some embodiments, the second stage isolated converter also includes a DC-DC primary circuit including a main switch coupled to the first stage boost converter, wherein the DC-DC primary circuit is configured to provide a driving signal to the main switch according to a digital control signal output from the DC-DC digital controller. In some embodiments, the digital control signal is modulated to include the phase compensation. In some embodiments, the second stage isolated converter includes a second stage isolated buck-type converter. In some embodiments, the second stage isolated converter also includes a DC-DC primary circuit block coupled to the PFC output voltage bus, a transformer coupled to the DC-DC primary circuit block, a DC-DC secondary circuit block coupled to the transformer and the DC-DC digital controller, and an isolator circuit block coupled to the DC-DC primary circuit block and the DC-DC digital controller. In some embodiments, the DC-DC digital controller includes a general purpose input/output interface, and the digital signal is input to the DC-DC digital controller at the general purpose input/output interface.

In another aspect, another power supply is disclosed. The power supply includes a first stage boost converter, a second stage isolated converter, and a low speed optical coupler. The first stage boost converter has a PFC circuit configured to receive as input an AC line voltage, to perform power factor correction, and to output a PFC voltage across a PFC output voltage bus, the PFC voltage having a DC voltage and an AC voltage ripple, and a PFC digital controller coupled to the PFC circuit, the PFC digital controller configured to sense a PFC current and the PFC voltage, to determine a phase difference between the PFC current and the PFC voltage, and to generate and output a digital signal signifying the determined phase difference. The second stage isolated converter is coupled to the PFC output voltage bus to receive as input the PFC voltage and to output a DC output voltage. The second stage isolated converter includes a DC-DC digital controller configured to sense the DC output voltage and to regulate the DC output voltage. The low speed optical coupler is coupled to the PFC digital controller and the DC-DC digital controller to receive as input the digital signal output from the PFC digital controller and to provide as output the digital signal to the DC-DC digital controller. The DC-DC digital controller is further configured to provide AC voltage ripple suppression using a phase compensation determined according to the digital signal. In some embodiments, the second stage isolated converter also includes a DC-DC primary circuit including a main switch coupled to the PFC output voltage bus, wherein the DC-DC primary circuit is configured to provide a driving signal to the main switch according to a digital control signal output from the DC-DC digital controller. In some embodiments, the digital control signal is modulated to include the phase compensation. In some embodiments, the second stage isolated converter comprises a second stage isolated buck-type converter. In some embodiments, the second stage isolated converter also includes a DC-DC primary circuit block coupled to the PFC output voltage bus, a transformer coupled to the DC-DC primary circuit block, a DC-DC secondary circuit block coupled to the transformer and the DC-DC digital controller, and an isolator circuit block coupled to the DC-DC primary circuit block and the DC-DC digital controller. In some embodiments, the DC-DC digital controller includes a general purpose input/output interface, and the digital signal is input to the DC-DC digital controller at the general purpose input/output interface.

BRIEF DESCRIPTION OF THE DRAWINGS

Several example embodiments are described with reference to the drawings. The example embodiments are intended to illustrate, but not to limit, the invention. The drawings include the following figures.

DETAILED DESCRIPTION OF THE EMBODIMENTS

Embodiments of the present application are directed to a power supply. Those of ordinary skill in the art will realize that the following detailed description of the power supply is illustrative only and is not intended to be in any way limiting. Other embodiments of the power supply will readily suggest themselves to such skilled persons having the benefit of this disclosure.

Reference will now be made in detail to implementations of the power supply as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 5:
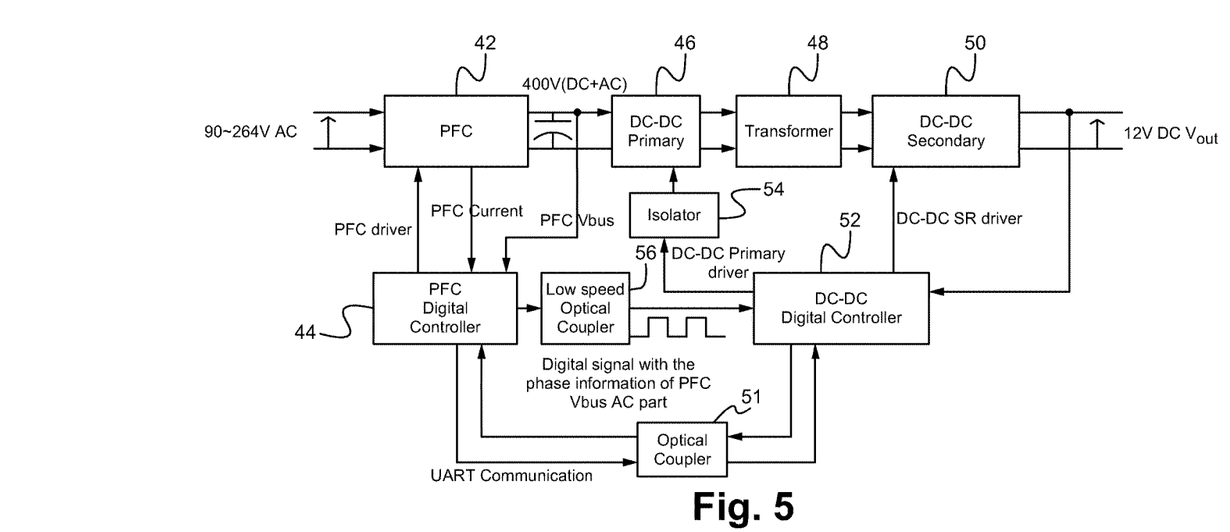
FIG. 5 illustrates a schematic block diagram of a power supply for suppressing a low frequency output voltage ripple according to an embodiment.

FIG. 5 illustrates a schematic block diagram of a power supply for suppressing a low frequency output voltage ripple according to an embodiment. The power supply is a cascading power supply having two stages. A first stage of the power supply includes a PFC circuit block 42 and a PFC digital controller 44 configured to function as a first stage PFC boost converter. The first stage PFC boost converter converts an input AC voltage, such as 110V or 220V AC line voltage, to a boosted output DC voltage, such as 400V DC, provided as a high voltage bus at the output of the PFC circuit block 42. Due to the AC-to-DC voltage conversion performed by the PFC circuit block 42, the high voltage bus includes both the high voltage DC voltage component and an AC voltage component, which is an AC voltage ripple. The AC voltage ripple on the 440V DC output has a frequency of 50-60 Hz. The PFC circuit block 42 is also configured to perform power factor correction under control of the PFC digital controller 44.

A second stage of the power supply includes a DC-DC primary circuit block 46, a transformer 48, a DC-DC secondary circuit block 50, a DC-DC digital controller 52 and an isolator circuit block 54 configured to function as a second stage isolated buck-type converter. The second stage isolated buck-type converter steps down the voltage at the high voltage bus to an isolated low voltage output, such as 12V DC. The isolator circuit block 54 includes an optical coupler and related circuitry for transmitting digital control signals from the DC-DC digital controller 52 to the DC-DC primary circuit block 46 across the isolation barrier formed by the transformer 48. The optical coupler in the isolator circuit block 54 is a high speed optical coupler. Each of the PFC digital controller 44 and the DC-DC digital controller 52 include a UART, and an optical coupler 51 enables UART communication between the PFC digital controller 44 and the DC-DC digital controller 52 across the insolation barrier. The optical coupler 51 is either a high speed optical coupler or a low speed optical coupler depending on the baud rate.

The second stage isolated buck-type converter has a voltage regulating circuit that includes the DC-DC digital controller 52 and the isolator circuit block 54. The DC-DC digital controller 52, via the isolator circuit block 54, provides a driver signal to the DC-DC primary circuit block 46, shown as DC-DC primary driver in FIG. 5. The DC-DC digital controller 52 is a regulator for the power supply to ensure the output voltage Vout is regulated. The DC-DC digital controller 52 senses a value of the output voltage Vout at the output of the DC-DC secondary circuit block 50, such as Vout-Feedback shown in FIG. 6, and compares the sensed output voltage value to a reference value, such as Vout-ref shown in FIG. 6, to generate an error value. The DC-DC primary driver signal is output based on the error value as well as an adjustment to suppress the AC ripple, as discussed in detail below. The DC-DC primary circuit block 46 includes a main switch coupled to the high voltage bus. The DC-DC primary driver signal is used to drive the main switch, the duty cycle of which is adjusted to compensate for any variances in the output voltage Vout. In some embodiments, the DC-DC primary driver signal is input to the main switch without primary side processing. In other embodiments, the DC-DC primary driver signal is input to a pulse width modulator (PWM) within the DC-DC primary circuit block 46. The PWM outputs a driving signal to the main switch in response to the received DC-DC primary driver signal. In still other embodiments, the DC-DC primary driver signal is simply the error signal adjusted for AC ripple suppression, or a representation of such signal, and the DC-DC primary circuit block 46 includes a primary side controller coupled to the main switch. The primary side controller receives the DC-DC primary driver signal from the isolator circuit block 54 and accordingly adjusts the duty cycle of the main switch to compensate for any variances in the output voltage Vout.

Each of the PFC digital controller 44 and the DC-DC digital controller 52 can be any type of conventional control logic circuit including, but not limited to, a programmable logic circuit, a CPU (central processing unit), a MCU (microcontroller unit), a DSP (digital signal processor), or the like.

The power supply can also include an EMI filter, typically coupled between an AC input source and the first stage of the power supply, to prevent noise from coupling back to the AC input source, as well as a full-wave diode rectifier bridge coupled to the EMI filter to provide a rectified sinusoidal input voltage to the first stage of the power supply. In some embodiments, such EMI filter and rectifier is considered part of the first stage of the power supply. The second stage of the power supply can include various combinations of rectifiers and windings on the secondary side of the transformer to generate an isolated DC output voltage. One typical variation is a full-bridge rectifier, which comprises four diodes configured to produce a same-polarity voltage output regardless of the polarity of the secondary winding voltage. A second typical variation comprises a center-tapped output such that the center tap is connected to a common point, and ends of each of the other two windings are connected to the anode of a diode. The cathodes of both diodes are connected to an output capacitor, and the other side of the output capacitor is attached to the center tap. Another variation is a current-doubler circuit. Still another variation is a split output in which one side of a center-tapped secondary charges a first output capacitor to a positive voltage and the other side of the center-tapped secondary charges a second output capacitor to a negative voltage. The two output capacitors are also connected to the center tap of the transformer. In some embodiments, the DC-DC secondary circuit block 50 includes a synchronous rectifier (SR), which is driven by the DC-DC digital controller 52 via a digital SR driver signal. It is understood that alternative secondary side circuit configurations are also contemplated. Further, although the second stage is described as an isolated buck-type power converter, a variety of different DC-to-DC power converter configurations can be used, most of which are variations of a buck converter, a boost converter, and a buck-boost converter. Some variations of buck converters include an isolating transformer, such as the second stage isolated buck-type power converter of FIG. 3. Some versions of isolated buck-type power converters include the push-pull converter, the forward converter, the half-bridge converter, and the full-bridge converter. Buck-type converters can either be duty-cycle-controlled switched converters, or they can be frequency-controlled resonant converters.

The PFC digital controller 44 senses the PFC output voltage at the high voltage bus, labeled as PFC Vbus, and also senses the PFC output current from the PFC circuit block 42, labeled as PFC current. The control information, or phase information, provided to the DC-DC digital controller 52 is not directed solely to the voltage level of the PFC output signal, but is also directed to the phase difference between the PFC output voltage and the PFC output current, which represents the AC voltage ripple output from the PFC circuit block 42. The PFC digital controller 44 calculates the phase difference between the PFC output current and the PFC output voltage. This phase difference is conveyed as a digital signal which is transmitted by a low speed optical coupler 56. The low speed optical coupler 56 optically transmits the digital signal to the DC-DC digital controller 52. In some embodiments, the digital signal is a digital square wave having a frequency of two times the AC line frequency, for example the digital signal frequency is 100-120 Hz. The digital signal output from the PFC digital controller 44 to the linear optical coupler 56 represents the phase information of the PFC Vbus AC component. In some embodiments, the amplitude of the AC voltage ripple is recovered from direct output current/voltage sensing at the secondary side since what the voltage to be suppressed is the actual voltage ripple on the output voltage. The phase information can not be similarly determined by simply sensing the current/voltage at the secondary side because the second stage causes phase delay. In other embodiments, the amplitude of the AC voltage ripple is determined by the PFC digital controller 44 sensing the voltage at the PFC Vbus and calculating the peak-to-peak AC voltage ripple at the PFC Vbus. This peak-to-peak value is transmitted by UART communication to the DC-DC digital controller 52 via the optical coupler 51. Since the amplitude is associated with a signal frequency of 100-120 Hz, the amplitude does not change too much across all input/output condition, and a 115200 baud rate of UART is fast enough. In still other embodiments, the amplitude information is a relatively constant value for each design (normally 10V-20V depending on the PFC design), so to simplify design, the amplitude can be measured during design and hard coded in the DC-DC digital controller 52. In general, delivery of the phase information is time critical, delay during phase information transfer will lose accuracy of the phase information. However, the transfer of the amplitude not time critical for this application since the amplitude information is relatively constant across all input/output conditions. The frequency information is automatically delivered with the phase information.

The determined phase and amplitude information represent the AC voltage ripple to be suppressed. The DC-DC digital controller 52 calculates phase and amplitude compensation (a virtual sinewave) based on the digital square wave signal, and adds the compensation value to the digital control loop (DC primary driver signal) to reduce the output voltage low frequency ripple.

Figure 6:
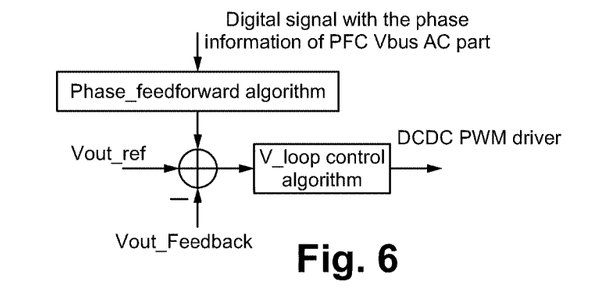
FIG. 6 illustrates an exemplary functional block diagram within the DC-DC digital controller of FIG. 5 used to implement the phase information feed forward control according to some embodiments.

FIG. 6 illustrates an exemplary functional block diagram within the DC-DC digital controller 52 of FIG. 5 used to implement the phase information feed forward control according to some embodiments. The phase information feed forward control uses the phase information of the AC portion of the PFC Vbus transmitted as the digital signal via the low speed optical coupler 56 as a feedback signal to the control loop. As shown in FIG. 6, the digital signal received by the DC-DC digital controller 52 is processed using a phase feed forward algorithm to determine the phase information. The phase information is then applied to a reference output voltage Vout ref to generate a modified reference voltage. The sensed output voltage, Vout Feedback, is compared to the modified reference output voltage, the difference of which is input to a voltage loop control algorithm. The voltage loop control algorithm outputs the DC-DC primary driver signal, such as the DC-DC PWM driver signal, which is transmitted to the DC-DC primary circuit block 46 via the isolator circuit 54. The DC-DC primary driver signal compensates for output ripple caused by the PFC Vbus AC ripple.

Figure 7:
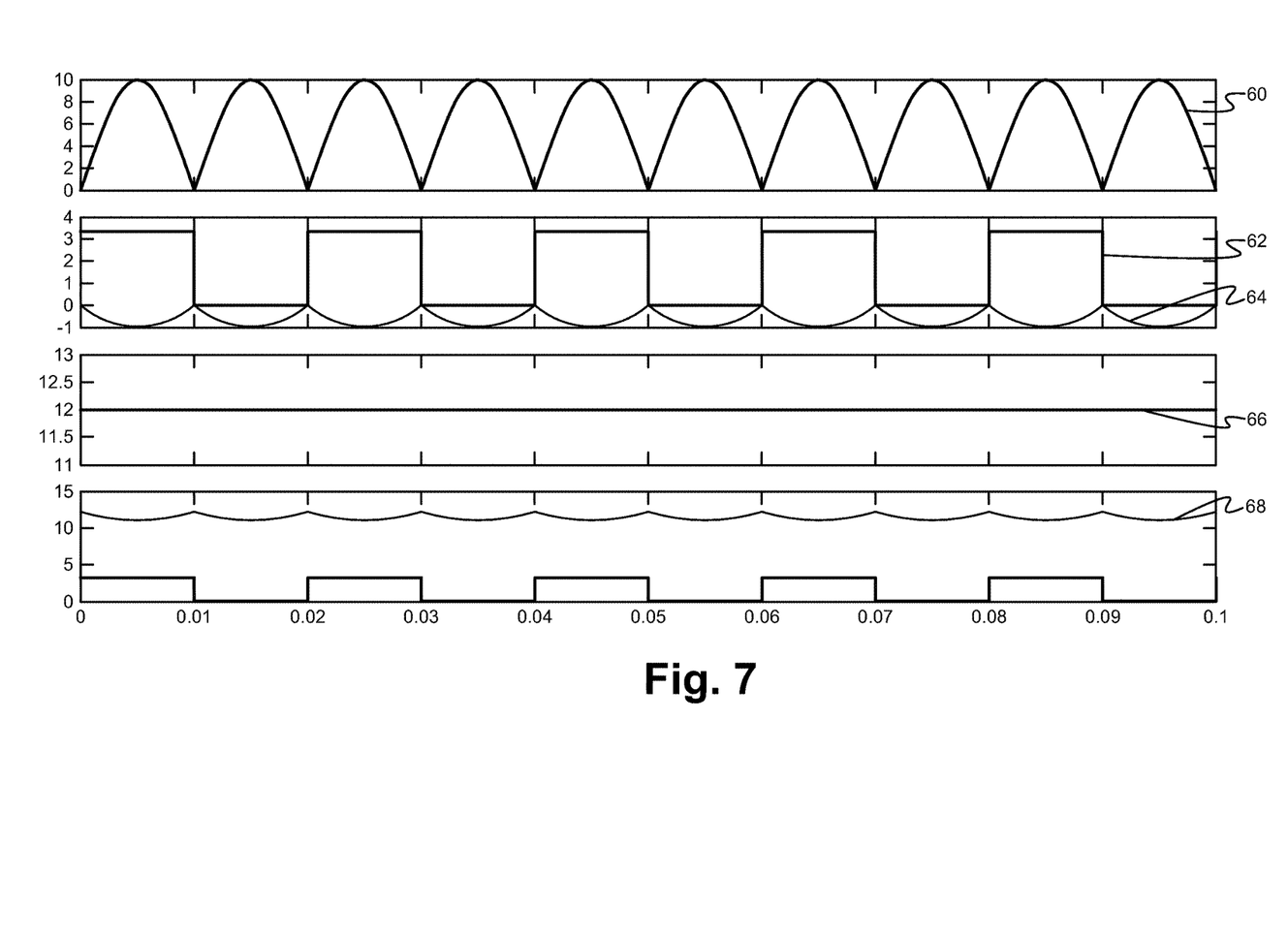
FIG. 7 illustrates a timing diagram of exemplary waveforms corresponding to the power supply of FIG. 5.

The phase information can be determined at specified phase points based on the received digital signal, for example at 0 degrees of the PFC output voltage, at 90 degrees, at 180 degrees and a 270 degrees. FIG. 7 illustrates a timing diagram of exemplary waveforms corresponding to the power supply of FIG. 5. Waveform 60 shows the rectified AC voltage component at the PFC Vbus, which is the AC ripple to be suppressed. It is the phase information of waveform 60 that is to be transmitted to the DC-DC digital controller 52. It is difficult to recover this phase information after the signal output from the PFC circuit block 42 is converted within the DC-DC primary circuit block 46 since the conversion causes the phase to shift. Therefore, the phase information is transmitted via the alternative pathway including the PFC digital controller 44 and the low speed optical coupler 56. Waveform 62 shows the digital signal output from the PFC digital controller 44 and received by the DC-DC digital controller 52. Waveform 62 is a result of converting the waveform 60 to a digital hi/low signal, which is easily delivered through the transformer isolation by the low speed optical coupler 56. Waveform 64 is the data recovered from the digital signal by the DC-DC digital controller 52, also referred to as the feed forward value. The phase and frequency is determined from the digital signal (waveform 62), and the amplitude can be approximated as around 10V (with active PFC control, ripple on bulk voltage is relatively constant without too much change across all input/output conditions). Knowing the amplitude, frequency and phase information, a sinusoid waveform such as waveform 64 can be easily recovered from the phase forward digital signal. In other embodiments, the recovered feed forward value can be simplified to a triangle waveform to reduce calculation load. Waveform 66 is the Vout reference value. Waveform 68 is the modified reference value which is the combination of the Vout reference value (waveform 66) and the feed forward value (waveform 64). The modified reference value is then compared to the sensed output voltage, Vout Feedback, the difference of which is input to the voltage loop control algorithm as shown in FIG. 6.

In the power supply of the present invention, the pre-existing processing capability of the PFC digital controller 44 is utilized to determine the phase information and to output a corresponding digital signal, which is transmitted using the less complex low speed optical coupler 56. The digital signal received by the DC-DC digital controller 52 from the low speed optical coupler 56 is received using a GPIO (General Purpose Input Output) circuit. In contrast, the second prior art approach shown in FIG. 2 does not use the PFC digital controller 24 to determine the phase information, instead the more complex linear optical coupler 36 receives as input the composite voltage value (DC component plus AC component) sensed at the high voltage bus and transmits an analog signal corresponding to the composite voltage value to the DC-DC digital controller 32. At the DC-DC digital controller 32, an ADC circuit is needed to process the analog signal received from the linear optical coupler, which is much more complex than a GPIO.

The power supply of the present invention provides numerous advantages and distinctions over the prior art. First, the power supply simply transmits the phase information using an optical coupler, whereas the prior art transmits the entire PFC Vbus signal (AC and DC components) to the DC-DC digital controller on the secondary side.

Second, the digital signal has information that translates to the phase information of the AC ripple. Since the feed forward control signal is a digital square wave signal, there is reduced interference compared to prior art feed forward control signals that are analog.

Third, a low speed optical coupler is used to transmit the feed forward control as a digital signal. The low speed optical coupler is less complex and less expensive than a linear optical coupler used in the prior art to transmit an analog signal.

Fourth, the feed forward control is a digital signal readily usable within the digital control loop implemented by the DC-DC digital controller. The secondary side control loop is entirely digital, so there is no need for any analog to digital conversion. The phase information in the digital signal is already in digital format usable by the DC-DC digital controller to determine and output the DC primary driver signal. The phase information also includes both the phase and amplitude, enabling both phase and amplitude ripple compensation for higher performance. In the prior art feed forward control approach, such as that shown in FIG. 2, the feed forward control signal only provides for amplitude compensation.

Fifth, due to the feed forward control being a digital signal it can be used by the DC-DC digital controller 52 to adjust a reference value in real-time to compensate for the AC ripple. In order to regulate the output voltage to a regulated value, the output voltage is sensed by the DC-DC digital controller 52 and compared to the reference value, the difference is an error signal used to generate the PC primary driver signal for driving the main switch in the DC-DC primary circuit block 46. In an exemplary application, the reference value can be increased to compensate for the lowest point of AC ripple, and decreased for the peak point The present application has been described in terms of specific embodiments incorporating details to facilitate the understanding of the principles of construction and operation of the power supply. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power supply comprising:
   a. a first stage boost converter configured to convert an input AC voltage to an output DC voltage and to perform power factor correction, wherein the first stage boost converter comprises a PFC digital controller configured to sense a PFC output current and a PFC output voltage, to determine a phase difference between the PFC output current and the PFC output voltage, and to generate and output a digital signal signifying the determined phase difference;
   b. a second stage isolated converter coupled to the first stage boost convert and configured to receive as input the PFC output voltage and to output a DC output voltage, wherein the second stage isolated converter includes a DC-DC digital controller configured to sense the DC output voltage and to regulate the DC output voltage; and
   c. a low speed optical coupler coupled to the PFC digital controller and the DC-DC digital controller to receive as input the digital signal output from the PFC digital controller and to provide as output the digital signal to the DC-DC digital controller, wherein the DC-DC digital controller is further configured to provide AC voltage ripple suppression using a phase compensation determined according to the digital signal.

2. The power supply of claim 1 wherein the second stage isolated converter further comprises a DC-DC primary circuit including a main switch coupled to first stage boost converter, wherein the DC-DC primary circuit is configured to provide a driving signal to the main switch according to a digital control signal output from the DC-DC digital controller.

3. The power supply of claim 2 wherein the digital control signal is modulated to include the phase compensation.

4. The power supply of claim 1 wherein the second stage isolated converter comprises a second stage isolated buck-type converter.

5. The power supply of claim 1 wherein the second stage isolated converter further comprises a DC-DC primary circuit block coupled to the PFC output voltage bus, a transformer coupled to the DC-DC primary circuit block, a DC-DC secondary circuit block coupled to the transformer and the DC-DC digital controller, and an isolator circuit block coupled to the DC-DC primary circuit block and the DC-DC digital controller.

6. The power supply of claim 1 wherein the DC-DC digital controller comprises a general purpose input/output interface, and the digital signal is input to the DC-DC digital controller at the general purpose input/output interface.

7. A power supply comprising:
   a. a first stage boost converter having a PFC circuit configured to receive as input an AC line voltage, to perform power factor correction, and to output a PFC voltage across a PFC output voltage bus, the PFC voltage having a DC voltage and an AC voltage ripple, and a PFC digital controller coupled to the PFC circuit, the PFC digital controller configured to sense a PFC current and the PFC voltage, to determine a phase difference between the PFC current and the PFC voltage, and to generate and output a digital signal signifying the determined phase difference;
   b. a second stage isolated converter coupled to the PFC output voltage bus to receive as input the PFC voltage and to output a DC output voltage, wherein the second stage isolated converter includes a DC-DC digital controller configured to sense the DC output voltage and to regulate the DC output voltage; and
   c. a low speed optical coupler coupled to the PFC digital controller and the DC-DC digital controller to receive as input the digital signal output from the PFC digital controller and to provide as output the digital signal to the DC-DC digital controller, wherein the DC-DC digital controller is further configured to provide AC voltage ripple suppression using a phase compensation determined according to the digital signal.

8. The power supply of claim 7 wherein the second stage isolated converter further comprises a DC-DC primary circuit including a main switch coupled to the PFC output voltage bus, wherein the DC-DC primary circuit is configured to provide a driving signal to the main switch according to a digital control signal output from the DC-DC digital controller.

9. The power supply of claim 8 wherein the digital control signal is modulated to include the phase compensation.

10. The power supply of claim 7 wherein the second stage isolated converter comprises a second stage isolated buck-type converter.

11. The power supply of claim 7 wherein the second stage isolated converter further comprises a DC-DC primary circuit block coupled to the PFC output voltage bus, a transformer coupled to the DC-DC primary circuit block, a DC-DC secondary circuit block coupled to the transformer and the DC-DC digital controller, and an isolator circuit block coupled to the DC-DC primary circuit block and the DC-DC digital controller.

12. The power supply of claim 7 wherein the DC-DC digital controller comprises a general purpose input/output interface, and the digital signal is input to the DC-DC digital controller at the general purpose input/output interface.

* * * * *